United States Patent
Agarwal et al.

(10) Patent No.: US 12,407,878 B2
(45) Date of Patent: Sep. 2, 2025

(54) METHOD AND SYSTEM FOR PREFETCHING TARGETED CONTENT

(71) Applicant: YAHOO ASSETS LLC, New York, NY (US)

(72) Inventors: Amit Agarwal, Mountain House, CA (US); Michael Chen, San Jose, CA (US); Abhishek Ghag, San Jose, CA (US); Sreekanth Mamidala, Mountain House, CA (US); Thomas Van Chung Ng, San Francisco, CA (US); Nam Nguyen, Pleasant Hill, CA (US)

(73) Assignee: YAHOO ASSETS LLC, New York, NY (US)

( * ) Notice: Subject to any disclaimer, the term of this patent is extended or adjusted under 35 U.S.C. 154(b) by 191 days.

(21) Appl. No.: 18/298,822

(22) Filed: Apr. 11, 2023

(65) Prior Publication Data
US 2024/0348841 A1    Oct. 17, 2024

(51) Int. Cl.
*H04N 21/2183* (2011.01)
*H04N 21/231* (2011.01)
*H04N 21/234* (2011.01)

(52) U.S. Cl.
CPC ... *H04N 21/2183* (2013.01); *H04N 21/23106* (2013.01); *H04N 21/23424* (2013.01)

(58) Field of Classification Search
CPC ......... H04N 21/23424; H04N 21/2183; H04N 21/23106; H04N 21/812
See application file for complete search history.

(56) References Cited

U.S. PATENT DOCUMENTS

| | | | |
|---|---|---|---|
| 2016/0127803 A1* | 5/2016 | Shanson | H04N 21/222 725/32 |
| 2016/0182923 A1* | 6/2016 | Higgs | H04H 20/106 725/34 |
| 2019/0373337 A1* | 12/2019 | Martell | H04N 21/475 |

* cited by examiner

*Primary Examiner* — Soe Hlaing
(74) *Attorney, Agent, or Firm* — James J. DeCarlo; Greenberg Traurig, LLP (57) ABSTRACT

In the embodiments, a novel prefetch service implemented on a prefetch server is provided to execute content (either targeted or selected) fetch requests in parallel with other requests thereby reducing the overall latency of a content delivery system. In some aspects, a method is provided to receive a prefetch request to prefetch a targeted content item to be presented prior to presenting a primary content item on a user device, the prefetch request including prefetch request parameters; generate, a callback URL associated with the prefetch request; transmit, to a primary content server, the callback URL; obtain a targeted content configuration corresponding to the prefetch request parameters; obtain the targeted content item based on the targeted content configuration; receive, a request to provide the targeted content item, the request including the callback URL; and transmit the targeted content item.

20 Claims, 5 Drawing Sheets

METHOD AND SYSTEM FOR PREFETCHING TARGETED CONTENT

BACKGROUND

Programmatic content delivery allows for the interspersion of targeted digital content alongside the delivery of primary or user-selected content. A notable example of this concept is the delivery of targeted advertising within video streaming. Typically, this type of content delivery follows a linear content delivery format with preroll content being played prior to the start of the intended content, midroll content being played one or more times throughout the intended content, and postroll content being played after the end of the intended content. The preroll position is generally the most desirable as it is the most likely to hold the user's gaze while the user waits for the intended content. However, fetching the preroll content configuration, resolving the preroll content, loading the content, and finally rendering it is a latency intensive process. Such increase in latency negatively impacts the user experience by not only making the user wait for the preroll content to start, but also making the user wait for the intended content.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The disclosure solves these and other problems in the art by parallelizing requests within a content delivery system and reducing the overall system latency. Typical delivery of targeted content can be broken broadly categorized into four latency phases, namely L1-L4 where all requests are synchronous and blocking (e.g., the system cannot move on to another process or request until a prior request or process has been completed).

In some implementations, during L1, a client (e.g., a multimedia player on a browser or application) implemented on User Equipment (UE) makes a request to a streaming backend (e.g., a primary content server) to fetch or provide primary content (e.g., selected or intended media) and/or a targeted content configuration. The streaming backend can then transmit a request to a rights management or targeted content mediation server to provide the targeted content configuration. The rights management server can return the configuration to the streaming backend who, in turn, forwards the configuration to the client. In some implementations, the targeted content configuration can include a waterfall sequence of targeted content Uniform Resource Locators (URLs) and/or other data and metadata corresponding to the targeted content responsive to the targeted content configuration request.

In some implementations, during L2, the client performs a series of internal processes related to the configuration (e.g., parsing, understanding, caching, etc.). In some embodiments, during L2 the client can extract the targeted content URLs. Then, in some implementations, during L3, the client can invoke (e.g., fetch from targeted content servers) each of the content URLs in the sequence of URLs included in the configuration until a responsive URL is found and receive the responsive targeted content from the responsive targeted content server. On average a client may perform one or more requests during this phase. In some implementations, this phase can represent the largest portion of the latency of the overall process.

In some implementations, during L4, the client can prepare a content renderer, load the targeted content, start playback, and/or track the targeted content. In some implementations, for example for preroll content, a user may wait through all the phases, L1-L4, before the targeted content can be played. Then, in some implementations, after the targeted content is played, the selected content may be played.

In the embodiments, a novel prefetch service implemented on a prefetch server is provided to execute content (either targeted or selected) fetch requests in parallel with other requests to reduce the overall latency of a content delivery system. For example, in some embodiments, the process of resolving multiple content URLs in L3 is offloaded to the prefetch server (as opposed to being performed by the client) to be performed in parallel to the tasks in L2, thereby reducing the user wait times, which are associated, in part, with a preset timeout value for the process and can be as long as 3 seconds. In some embodiments, the client only has to transmit a single request to the prefetch server. In some embodiments, the disclosed prefetch server can provide latency improvements of between 300 ms and 500 ms on phases L2 and/or L3.

Figure 1:
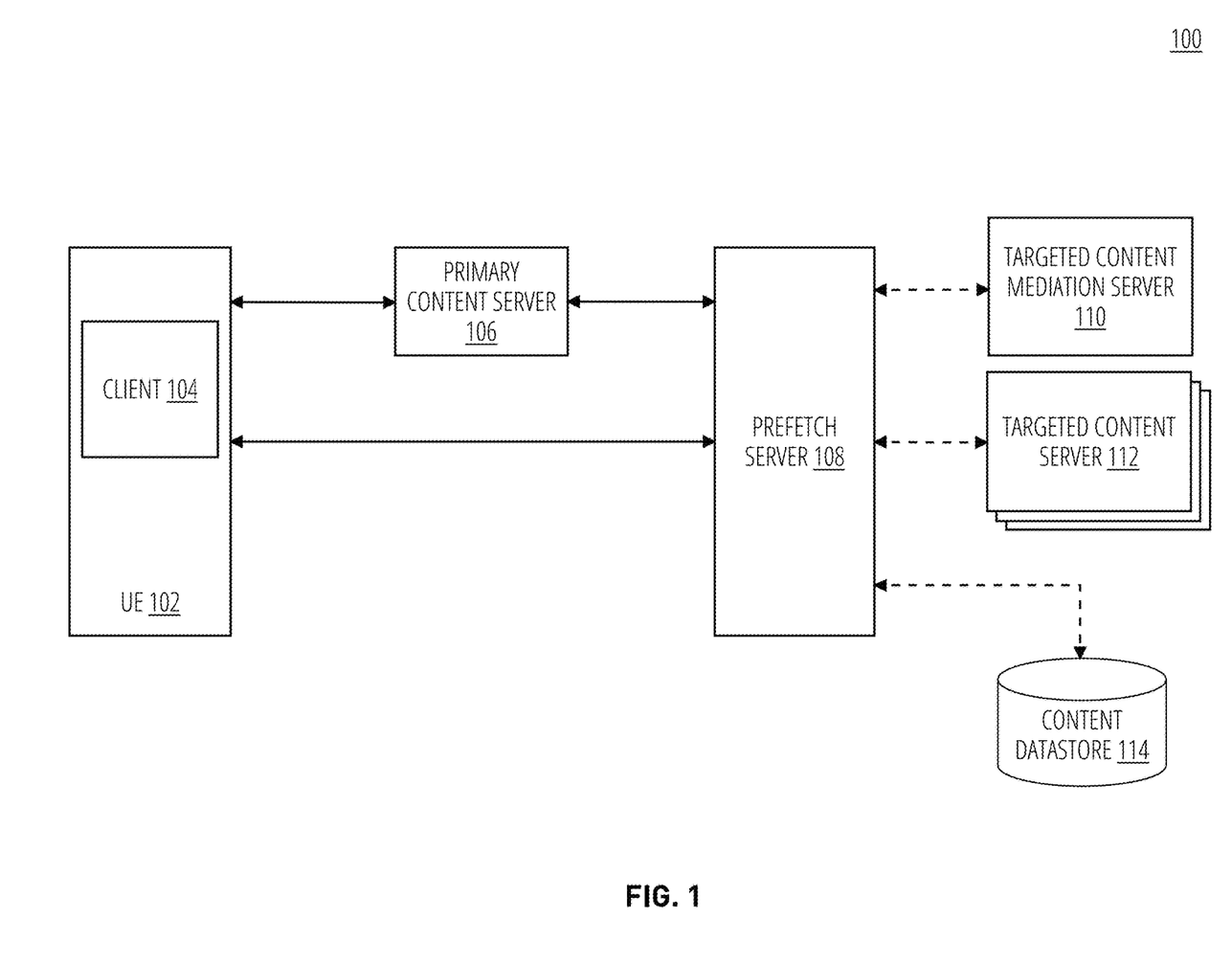
FIG. 1 is a block diagram illustrating a content delivery environment within which the systems and methods disclosed herein could be implemented according to an embodiment.

In the embodiments, the prefetch server acts as an intermediary between the client and the primary content server on one side and the mediation server and the targeted content server on the other (e.g., as shown in FIG. 1). In some embodiments, the request and responses between the client, the primary content server and the prefetch server can be synchronous. In some embodiments, the requests and responses between the prefetch server, the mediation server, and the targeted content server can be asynchronous.

In the embodiments, client can transmit a targeted content configuration request to the primary content server which can then transmit a prefetch request to the prefetch server based on the configuration request. In turn, in some embodiments, the prefetch server can generate a novel prefetch or callback URL including a unique callback ID and provide it to the primary content server who can then transmit a modified targeted content configuration to the client. In some embodiments, the modified targeted content configuration can include the callback URL with the unique callback ID. In some embodiments, a modified targeted content configuration can have the same structure as a traditional targeted content configuration (e.g., an Ad config) and include the callback URL and/or the unique callback ID. In some embodiments, once the client has processed the modified targeted content configuration, the client invokes the callback URL to fetch the targeted content from the prefetch server.

In the meantime, in some embodiments, the prefetch server can asynchronously fetch a traditional targeted content configuration from the mediation server based on the prefetch request received from the primary content server. In some embodiments, the traditional targeted content configuration can include a waterfall sequence of targeted content URLs. In some embodiments, the prefetch server can resolve each of the targeted content URLs in the sequence and once a responsive content URL is found and the targeted content is received, the prefetch server can maintain the targeted content in local storage or store the targeted content in a temporary store. In some embodiments, the targeted content in the temporary store can be associated with the callback URL and/or unique callback ID. In some embodiments, when the client invokes the prefetch URL to fetch the targeted content from the prefetch server, the prefetch server can quickly provide the targeted content.

In some aspects, the techniques described herein relate to a method including: receiving, from a primary content server, a prefetch request to prefetch a targeted content item to be presented prior to presenting a primary content item on a user device, the prefetch request including prefetch request parameters; generating, a callback Uniform Resource Locator (URL) associated with the prefetch request; transmitting, to the primary content server, the callback URL; obtaining, from a targeted content mediation server, a targeted content configuration corresponding to the prefetch request parameters; obtaining, from a targeted content server, the targeted content item based on the targeted content configuration; receiving, from a client on the user device, a request to provide the targeted content item, the request including the callback URL; and transmitting, to the client, the targeted content item.

In some aspects, generating the callback URL can include generating a unique callback ID, wherein the unique callback ID is part of the callback URL, and wherein the unique callback ID is a universally unique identifier (UUID).

In some aspects, the method can further comprise storing the targeted content item in a datastore and associating the targeted content item with the callback URL in the datastore.

In some aspects, the method can further comprise, upon receiving the request to provide the targeted content item, retrieving from the datastore the targeted content item associated with callback URL included in the request from the client.

In some aspects, the targeted content configuration can include a waterfall sequence of targeted content URLs, and wherein obtaining the targeted content item can include resolving each of the targeted content URLs in the sequence until a responsive targeted content server is found.

In some aspects, the targeted content item can be an advertisement.

In some aspects, the targeted content item can be transmitted to the client in a format selected from the group consisting of an Interactive Advertising Bureau (IAB) Video Multiple Ad Playlist (VMAP) format and a Video Ad Serving Template (VAST) format.

In some aspects, the techniques described herein relate to a non-transitory computer-readable storage medium, the computer-readable storage medium including instructions that when executed by a device, cause the device to receive, from a primary content server, a prefetch request to prefetch a targeted content item to be presented prior to presenting a primary content item on a user device, the prefetch request including prefetch request parameters; generate, a callback Uniform Resource Locator (URL) associated with the prefetch request; transmit, to the primary content server, the callback URL; obtain, from a targeted content mediation server, a targeted content configuration corresponding to the prefetch request parameters; obtain, from a targeted content server, the targeted content item based on the targeted content configuration; receive, from a client on the user device, a request to provide the targeted content item, the request including the callback URL; and transmit, to the client, the targeted content item.

In some aspects, the techniques described herein relate to a device comprising a processor configured to receive, from a primary content server, a prefetch request to prefetch a targeted content item to be presented prior to presenting a primary content item on a user device, the prefetch request including prefetch request parameters; generate, a callback Uniform Resource Locator (URL) associated with the prefetch request; transmit, to the primary content server, the callback URL; obtain, from a targeted content mediation server, a targeted content configuration corresponding to the prefetch request parameters; obtain, from a targeted content server, the targeted content item based on the targeted content configuration; receive, from a client on the user device, a request to provide the targeted content item, the request including the callback URL; and transmit, to the client, the targeted content item.

Various details regarding the aforementioned embodiments are described herein.

FIG. 1 is a block diagram illustrating a content delivery environment within which the systems and methods disclosed herein could be implemented according to an embodiment.

According to some embodiments, a content delivery system 100 can include a client 104 implemented on a user device or User Equipment (UE) 102. In some embodiments, client 104 can be a multimedia (e.g., video, sound, images) player in a browser or other application. In some embodiments, content delivery system 100 can include a primary content server 106 communicatively coupled to the UE 102 and a novel prefetch server 108. In FIG. 1. synchronous requests and operations are denoted by solid lines while asynchronous requests or operations are denoted by dashed lines.

In some embodiments, the primary content server 106 can be a streaming server or a backend server. In some embodiments, the primary content server 106 can implement a digital content backend server or service to provide primary content to clients. In some embodiments, the backend server or service can include an application programming interface (API) with streaming functionality to provide programmatic access to multimedia or other digital content. In some embodiments, the API can provide functionality such as video transcoding, adaptive bitrate streaming, and support video playback on a variety of user devices. In some embodiments, primary content server 106 can include as part of internal storage or obtain from external storage (or some other third party) multimedia files or other content corresponding to content that is selected or intended by a user (e.g., primary content), referred to herein as primary content. For example, in some embodiments, primary content can include a movie, a song, a podcast, and the like. As used herein, instances of targeted content or primary content can be referred to as content items. For example, in some embodiments, a targeted content item can be a 30 second advertising video. In some embodiments, a primary content item can be a 90 minute movie.

In some embodiments, the client 104 of the UE 102 can communicate with the primary content server 106 over any communication protocol. For example, in some embodiments, the communication protocol can include a bidirectional like websocket. In some of those embodiments, the client 104 can submit a prefetch request (as described below in relation FIG. 2) to primary content server 106 in one direction, and then primary content server 106 can respond with a callback URL or unique callback ID to the client 104 in the other direction. In some embodiments, after the prefetch request is completed, the primary content server 106 can further respond with a final response to the client 104.

In some embodiments, the client 104 of the UE 102 can communicate with the primary content server 106 using an asynchronous API model implemented in the primary content server 106. In some embodiments, an asynchronous API model can have be a publisher-subscriber model. In some of those embodiments, the API in the primary content server 106 can provide a topic or channel to which the client 104 may subscribe. In some of those embodiments, the client 104 can submit a prefetch request to primary content server 106 to the asynchronous API. In some embodiments, the API can return immediately. In some embodiments, once the prefetch request is complete, primary content server 106 may publish the response on the appropriate topic/channel that client has subscribed to. In some embodiments, publishing the response can notify the client 104 to pick up the response from the API.

In some embodiments, the novel prefetch server 108 can be communicatively coupled to a targeted content mediation server 110, a targeted content server 112, and/or a content datastore 114. While FIG. 1 illustrates, prefetch server 108 communicatively coupled to one targeted content server 112, the disclosure is not so limited. In some embodiments, prefetch server 108 can be communicatively coupled to a plurality of targeted content servers 112 and may determine based on requests from the UE 102 and the primary content server 106 (including information from the targeted content mediation server 110) which targeted content server 112 to communicate with.

In some embodiments, the targeted content mediation server 110 can be a general digital content rights management server. In some embodiments, the targeted content mediation server can be an advertising ("Ad") mediation server. In some embodiments, targeted content mediation server 110 can be a rules engine that responds to a targeted content configuration request, as described herein, by providing a waterfall sequence of targeted content URLs responsive to the configuration request. In some embodiments, the waterfall sequence of targeted content URLs can include weights or other scoring scheme to rank the content URLs in order of desirability or their responsiveness to the configuration request.

In some embodiments, the targeted content server 112 can be a centralized repository of targeted content. In some embodiments, targeted content server 112 can include as part of internal storage or obtain from external storage (or some other third party) multimedia files or other content corresponding to targeted content. For example, in some embodiments, targeted content can include personalized advertising (e.g . . . geographically, demographically, behaviorally, or contextually targeted). In some embodiments, targeted content server 112 can respond to request to provide targeted content by obtaining the targeted content and providing the targeted content along with any other data, metadata, or content files required for a client to display or reproduce the targeted content to a user.

In some embodiments, content datastore 114 can provide content caching and storage for prefetch server 108. In some embodiments, content datastore 114 can be a distributed storage or caching system. For example, in some embodiments, content datastore 114 can be a distributed caching system such as Redis. In some embodiments, the content datastore 114 can store targeted content and other associated information from prefetch server 108. In some embodiments, the prefetch server 108 can receive the targeted content from targeted content server 112 and store it on content datastore 114 for later access. In some embodiments, the content datastore 114 may only keep the targeted content for a period of time (e.g., 30 minutes).

Figure 2:
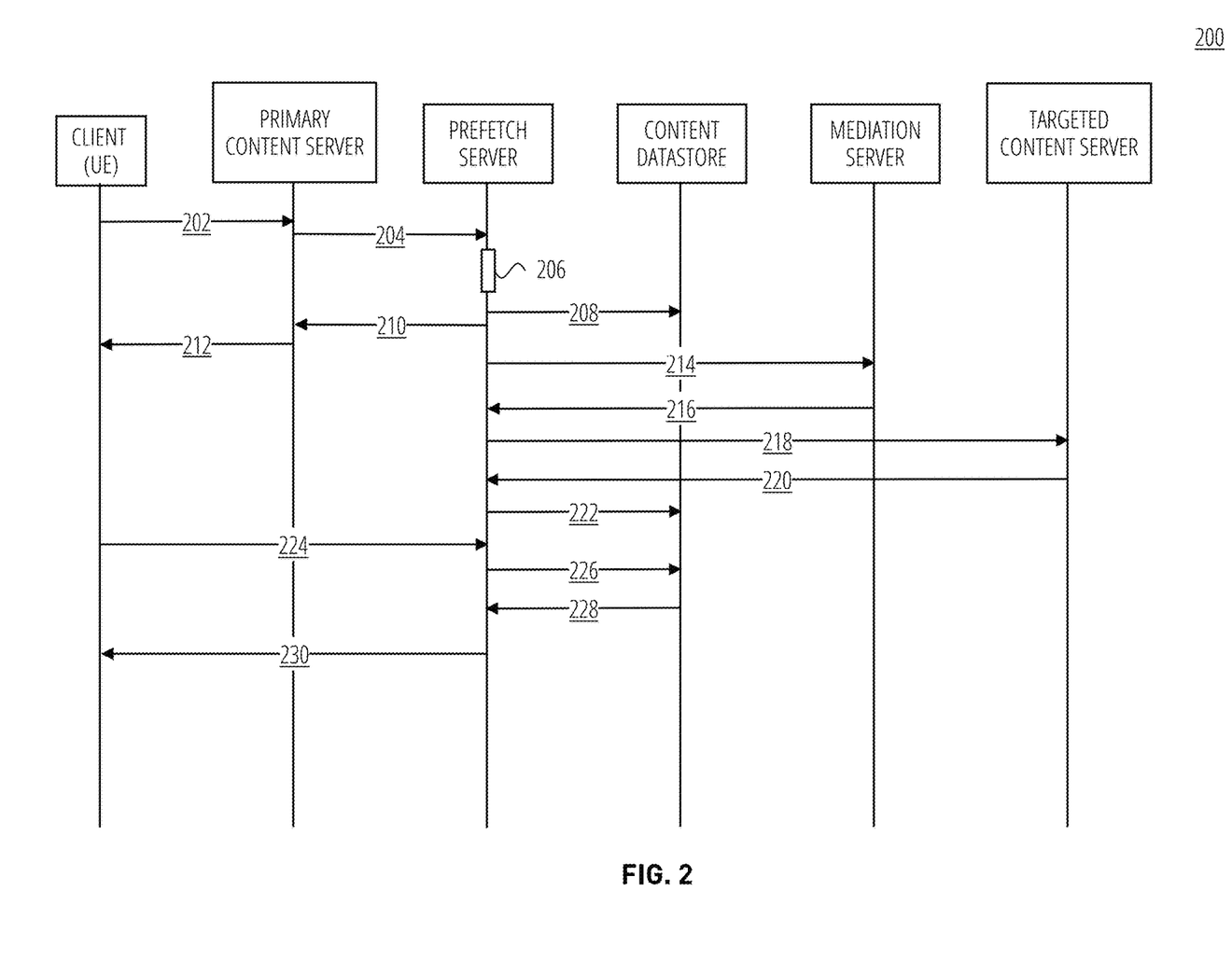
FIG. 2 is a call flow diagram illustrating a method for providing targeted content according to an embodiment.

FIG. 2 is a call flow diagram illustrating a method for providing targeted content according to an embodiment.

In Step 202, method 200 can include transmitting, from a client (e.g., client 104) implemented on a UE (e.g., UE 102) of a user to a primary content server (e.g., a primary content server 106), a targeted content configuration request (e.g., a config request). In some embodiments, the targeted content configuration request can be an "ad config" request. In some embodiments, the primary content server can be a streaming server. In some embodiments, the config request can be received by a streaming API (SAPI). In some embodiments, the config request can include a targeted content unit ID (e.g., a unique identifier for the targeted content placement on the client's website or application), a targeted content format (e.g., a type of targeted content format (e.g. banner, interstitial, native) and any relevant dimensions), targeting parameters (e.g., demographic, geographic, and behavioral criteria), user information (e.g., in the form of cookies), a UE or device type (e.g., the type of device the ad will be displayed on (e.g. desktop, mobile, tablet)), a session ID, and/or a client ID (e.g., a media player ID). In some embodiments, the config request can be a request to identify and/or provide a targeted content item.

In some embodiments, the client can be configured with a playlist of primary content. In those embodiments, in Step 202, when the client transmits the targeted content configuration request to the primary content server, the targeted content configuration request can include a parameter indicating that the primary content requested as part of the targeted content configuration request is the first primary content in the playlist. In some embodiments, the targeted content configuration request can include a parameter to indicate to the primary content server that prefetch servers are supported by the client.

In Step 204, method 200 can include transmitting, from the primary content server to a prefetch server (e.g., prefetch server 108), a prefetch request or prefetch submit. In some embodiments, the prefetch request can include information from the targeted content configuration request. In some embodiments, the prefetch request can include all request parameters required by a mediation server (e.g., targeted content mediation server 110).

In some embodiments, in response to receiving the prefetch request, the prefetch server can perform operation 206 to generate a prefetch or callback URL. In some embodiments, the callback URL can include a unique callback ID. In some embodiments, the callback URL can include or be associated with information contained in the targeted content configuration request and/or the prefetch request. In some embodiments, the unique callback ID can be a universally unique identifier (UUID). In some embodiments, operation 206 can include using UUID generator to generate the unique callback ID. In some embodiments, the callback URL can include instructions or parameters to re-execute a callback URL fetch when a previous callback URL fetch was unsuccessful (e.g., when no targeted content was responsive to a targeted content request in Steps 224-230 because of the targeted content has not been received from a targeted content server or the datastore entry has expired, as discussed below).

In Step 208, method 200 can include storing, by the prefetch server on a content datastore (e.g., content datastore 114), the callback URL, the unique callback ID, and/or the prefetch request. In some embodiments, the callback URL, the unique callback ID, and/or the prefetch request can be stored as an associated set in the content datastore. In some embodiments, the stored callback URL can have an associated prefetch expiration period (e.g., 30 minutes) indicating the period of time the entry will be kept in the datastore before being deleted. In some embodiments, if no targeted content request is received (e.g., in Step 224 below) within the expiration period, then the entry is deleted.

In Step 210, method 200 can include transmitting, from the prefetch server to the primary content server, the callback URL and/or unique callback ID in response to the prefetch request in Step 204. Then, in Step 212, method 200 can include the primary content server transmitting a modified targeted content configuration with the callback URL and/or unique callback ID. In some embodiments, the modified targeted content configuration can be similar to a traditional targeted content configuration but include the callback URL and/or unique callback ID instead of a waterfall sequence of targeted content URLs.

In Step 214, method 200 can include transmitting, from the prefetch server to a mediation server (e.g., targeted content mediation server 110), a targeted content configuration request. In some embodiments, the targeted content configuration request can be similar to or include information contained within the targeted content configuration request of Step 202 and/or the prefetch request of Step 204.

In Step 216, method 200 can include transmitting, from the mediation server to the prefetch server, a targeted content configuration. In some embodiments, the targeted content configuration can include one or more targeted content URLs corresponding to targeted content that is responsive or otherwise matches the parameters and information in the targeted content configuration request of Step 202 and/or the prefetch request of Step 204.

In some embodiments, targeted content configuration can include weights or scores associated with each targeted content URL indicating a level of responsiveness or desirability of the targeted content corresponding to each URL. In some embodiments, the targeted content configuration can include an object associated with the position of the targeted content with respect to the primary content (e.g., preroll, midroll, bumper, postroll). In some embodiments, the targeted content configuration can include multiple sections, each pertaining to a distinct targeted content position with respect to the primary content. In some embodiments, the client and other elements of the content delivery system can interpret the object and deliver targeted content based on the interpretation.

In Step 218, method 200 can include transmitting, from the prefetch server to a targeted content server (e.g., targeted content server 112), a request to provide targeted content associated with a targeted content URL received (otherwise as resolving a URL) as part of the targeted content configuration in Step 216. In some embodiments, in Step 218, the prefetch server can resolve each targeted content URL in the waterfall sequence of targeted content URLs in an order dictated by the associated weight or score of each URL. In some embodiments, the targeted content server can be different for each targeted content URL. In some embodiments, the prefetch server can attempt to resolve each URL in order until a targeted content server responds. In some embodiments, after a responsive targeted content server is found, the prefetch server stops trying to resolve any other targeted content URLs.

In Step 220, method 200 can include transmitting, from the responsive targeted content server to the prefetch server, the targeted content and any data and/or metadata associated with the targeted content. In some embodiments, transmitting the targeted content can include transmitting a media file.

In Step 222, method 200 can include storing, by the prefetch server on the content datastore, the targeted content and any data and/or metadata associated with the targeted content. In some embodiments, the targeted content and any data and/or metadata associated with the targeted content can be associated with the datastore entry including the callback URL and/or the unique callback ID.

In Step 224, method 200 can include transmitting, by the client on the UE to the prefetch server, a targeted content request. In some embodiments, the targeted content request can include the callback URL and/or the unique callback ID. In some embodiments, the targeted content request from the client can request and the response in Step 230 can be in an Interactive Advertising Bureau (IAB) Video Multiple Ad Playlist (VMAP) or a Video Ad Serving Template (VAST) format.

In Step 226, method 200 can include transmitting, by the prefetch server from the content datastore, a request to provide the targeted content associated with the callback URL and/or unique callback ID included in the targeted content request.

In Step 228, method 200 can include transmitting, from the content datastore to the prefetch server, the targeted content and any data and/or metadata associated with the targeted content.

In Step 230, method 200 can include transmitting, from the prefetch server to the client on the UE, the targeted content and any data and/or metadata associated with the targeted content. In some embodiments, the prefetch server responds to the targeted content request with an Extensible Markup Language (XML) file including the targeted content and any data and/or metadata associated with the targeted content In some embodiments, Steps 214-222 can be performed in parallel with Step 224. That is, in some embodiments, Steps 214-222 can be asynchronous from Steps 224-230. In some embodiments, resolving the targeted content URLs in the sequence can be added to a job queue to be executed in the background while handling requests from primary content servers, clients, or other entities. In some embodiments, prefetch server can implement a consumer queue to manage the requests from the primary content servers, clients, and other entities In some embodiments, if Steps 214-222 have not been completed before the targeted content request is received at the prefetch server, then the prefetch server will wait to respond until Steps 214-222 are complete. In some embodiments, if a targeted content request has been received by the prefetch server prior to the completion of Steps 214-222, then the prefetch server can skip Step 222, and respond to the targeted content request directly upon receiving the targeted content from the targeted content server.

In some embodiments, after responding to a targeted content request, the prefetch server can communicate with the content datastore to delete the entity associated with the callback URL in the targeted content request. In some embodiments, in Step 224, if no targeted content has been received by the prefetch server, the prefetch server can respond to the targeted content request with an acknowledgement that the request was received and that no targeted content exists responsive to the targeted content request. In some embodiments, some targeted content requests may be unresolved because they corresponded to targeted content that was not preroll or for a first video. In those embodiments, the prefetch server can store the targeted content request in the content datastore for later access and avoid another request to the mediation server.

Figure 3:
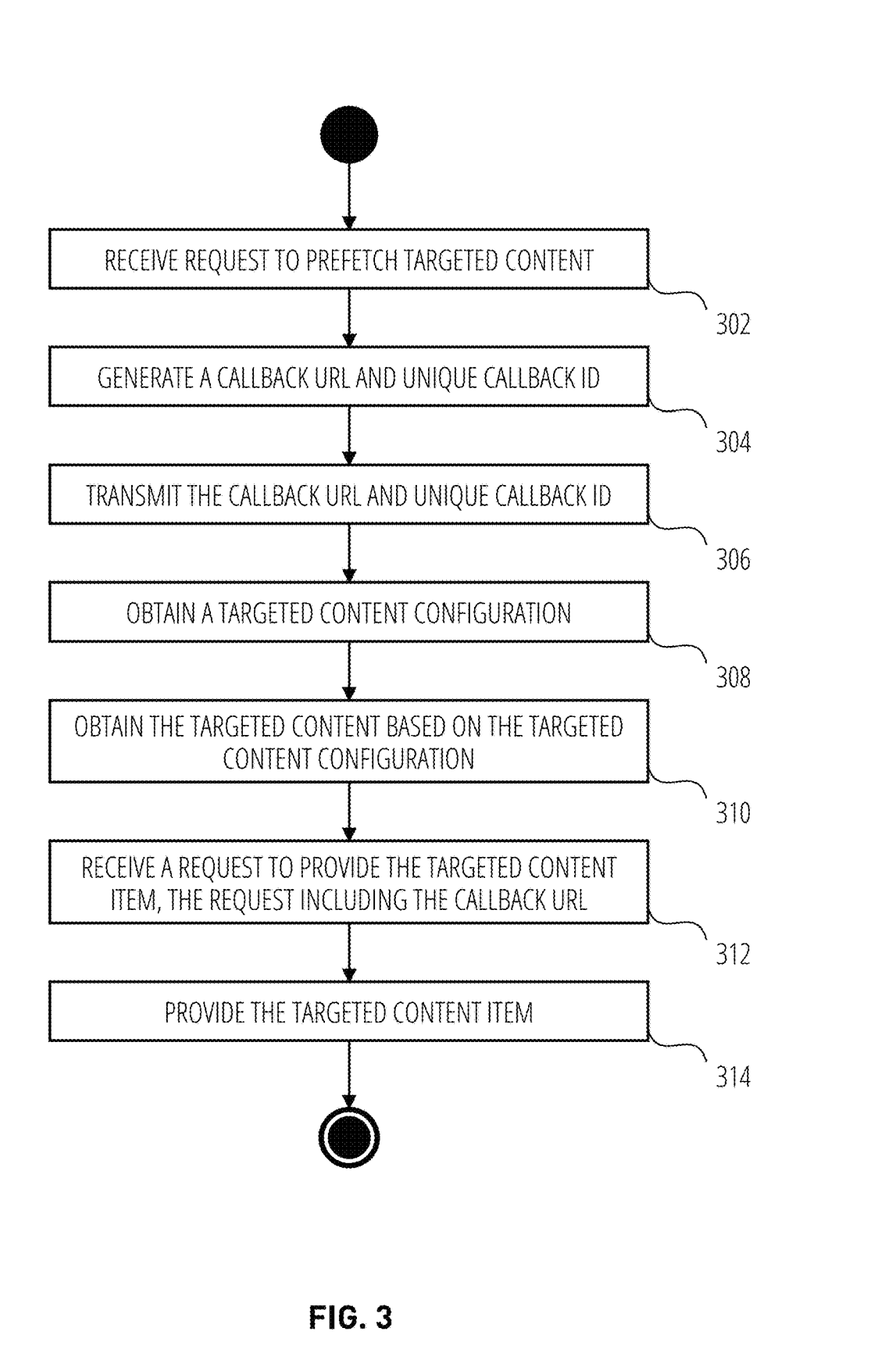
FIG. 3 is a flow diagram illustrating a method for providing targeted content according to some embodiments.

FIG. 3 is a flow diagram illustrating a method for providing targeted content according to some embodiments.

In Step 302, method 300 can include receiving, from a primary content server (e.g., primary content server 106) at a prefetch server (e.g., prefetch server 108), a prefetch request. In some embodiments, the prefetch request can be a request to obtain targeted content configuration for a targeted content item. In some embodiments, the targeted content item can be multimedia content to be presented prior to presenting a primary content item on a user device (e.g., UE 102, devices 402-408, or device 500). In some embodiments, the prefetch request can include prefetch request parameters. In some embodiments, prefetch request parameters can include parameters or information from a targeted content configuration request received at the primary content server from a client (e.g., browser, application, media player, and the like) implemented on the user device. In some embodiments, the prefetch request parameters specify the type of targeted content that can be interspersed in the primary content playback. In some embodiments, the prefetch request parameters can include an indication that the primary content to be presented after the targeted content is a first content item on a playlist.

In Step 304, method 300 can include generating a callback URL in response to receiving the prefetch request. In some embodiments, the callback URL is a URL that resolves to the prefetch server. In some embodiments, the callback URL can include a unique callback ID. In some embodiments, the callback URL and unique callback ID can be associated with the prefetch request. In some embodiments, the callback URL, the unique callback ID, and/or the prefetch request can be associated and/or stored in a content datastore (e.g., content datastore 114). In some embodiments, the unique callback ID can be a UUID generated by a UUID generator.

In Step 306, method 300 can include transmitting, from the prefetch server to the primary content server, the callback URL and/or unique callback ID. In some embodiments, the primary content server can forward the callback URL and unique callback ID to the client on the user device.

In Step 308, method 300 can include obtaining, from a targeted content mediation server (e.g., targeted content mediation server 110) by the prefetch server, a targeted content configuration. In some embodiments, in Step 308, method 300 can include the prefetch server transmitting to the targeted content mediation server a targeted content configuration request. In some embodiments, the targeted content configuration request can include some or all of the prefetch request parameters. In some embodiments, in Step 308, method 300 can include receiving, from the content mediation server, the targeted content configuration. In some embodiments, the targeted content configuration can include a waterfall sequence of targeted content URLs corresponding to targeted content servers that can provide targeted content matching the prefetch request/targeted content configuration request parameters.

In Step 310, method 300 can include obtaining, by the prefetch server from a targeted content server (e.g., targeted content server 112) the targeted content or targeted content item. In some embodiments, in Step 310, method 300 can include sequentially calling each of the targeted content URLs (e.g., by communicating with the corresponding targeted content server) in the waterfall sequence until a response is received from one of the targeted content servers. In some embodiments, the targeted content URLs in the sequence can be ordered based on a score or weight indicating a responsiveness to the targeted content configuration request. In some embodiments, the targeted content can be stored in the content datastore along with the callback URL, the unique callback ID, and any other data and/or metadata corresponding to each.

In Step 312, method 300 can include receiving, from a client on a UE at the prefetch server, a request to provide targeted content. In some embodiments, the request to provide targeted content can include the callback URL and/or the unique callback ID.

In Step 314, method 300 can include providing, by the prefetch server to the client on the UE, the targeted content along with any data and/or metadata associated with the targeted content. In some embodiments, in Step 314, method 300 can include retrieving the targeted content from the content datastore along with any data and/or metadata related thereto. In some embodiments, providing the targeted content to the client can include transmitting the targeted content to the client.

Figure 4:
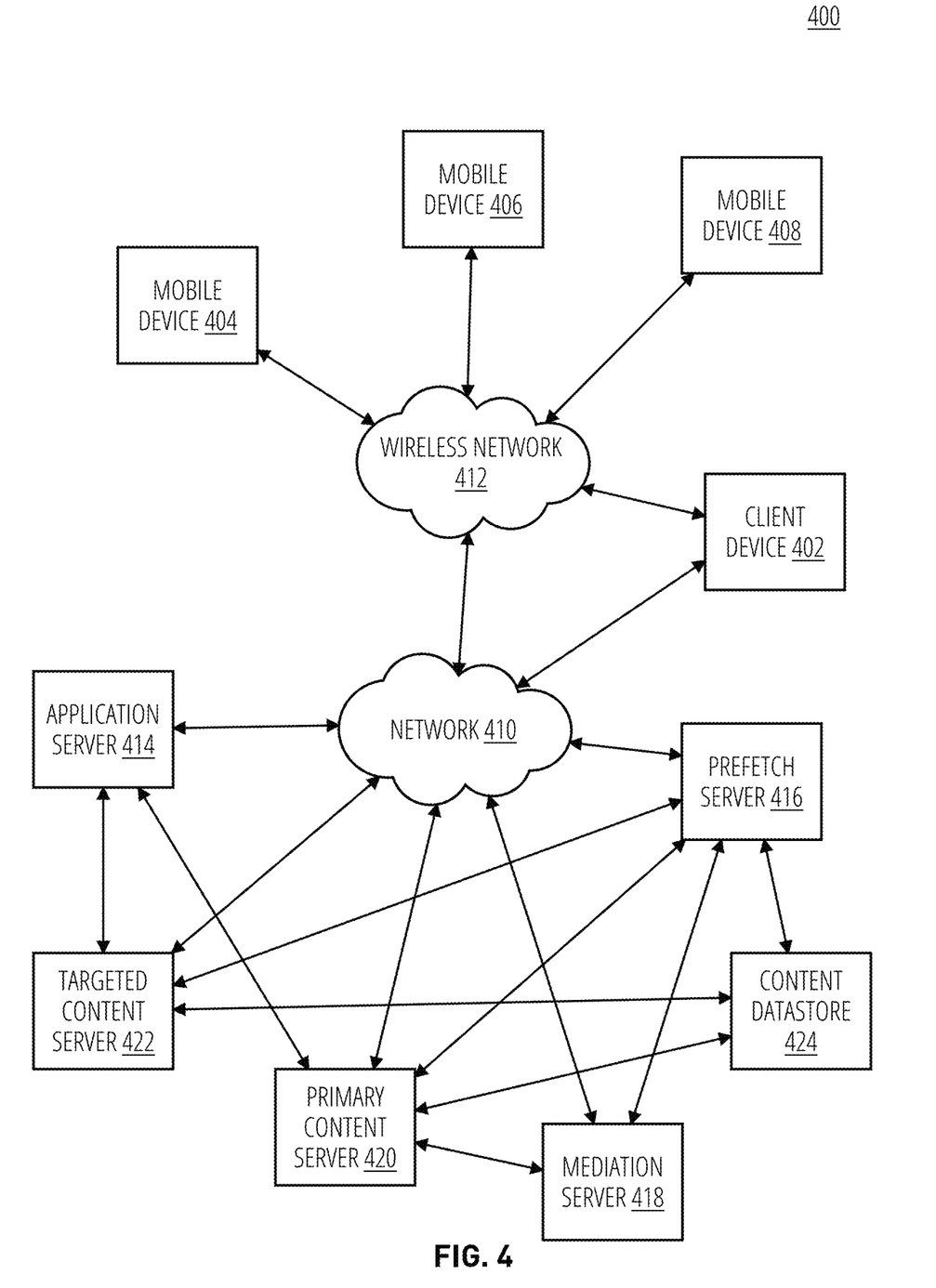
FIG. 4 is a block diagram illustrating an example of a network within which the systems and methods disclosed herein could be implemented according to some embodiments.

FIG. 4 is a block diagram illustrating an example of a network within which the systems and methods disclosed herein could be implemented according to some embodiments.

FIG. 4 shows components of a general environment in which the systems and methods discussed herein may be practiced. Not all the components may be required to practice the disclosure, and variations in the arrangement and type of the components may be made without departing from the spirit or scope of the disclosure.

FIG. 4 illustrates a system 400 in accordance with an embodiment of the present disclosure is shown. As shown, system 400 can include local area networks ("LANs")/wide area networks ("WANs")—network 410, wireless network 412, mobile devices (client device) 404-408 and client device 402. System 400 can also include a variety of servers, such as application ("App") server 414, prefetch server 416, mediation server 418, primary content server 420, and targeted content server 422.

One embodiment of mobile devices 404-408 is described in more detail below. Generally, however, mobile devices 404-408 can include virtually any portable computing device capable of receiving and sending a message over a network, such as network 410, wireless network 412, or the like. In some embodiments, mobile devices 404-408 can also be described generally as client devices that are configured to be portable.

Mobile devices 404-408 can also include at least one client or client application that is configured to receive content from another computing device. In some embodiments, the client application can include a capability to provide and receive textual content, graphical content, audio content, and the like. In some embodiments, the client application can further provide information that identifies itself, including a type, capability, name, and the like. In one embodiment, mobile devices 404-408 may uniquely identify themselves through any of a variety of mechanisms, including a phone number, Mobile Identification Number (MIN), an electronic serial number (ESN), or other mobile device identifier.

In some embodiments, mobile devices 404-408 can also communicate with non-mobile client devices, such as client device 402, or the like. In some embodiments, client device 402 may include virtually any computing device capable of communicating over a network to send and receive information.

In some embodiments, devices 402-408 can be referred to as computing devices. Devices 402-408 may be capable of sending or receiving signals, such as via a wired or wireless network, or may be capable of processing or storing signals, such as in memory as physical memory states, and may, therefore, operate as a server. Computing devices may, for example, include portable, non-portable, and wearable devices (e.g., desktop computers, cellular phones, smart watches, and tablets).

Wireless network 412 can be configured to couple mobile devices 404-408 and its components with network 410. Wireless network 412 can include any of a variety of wireless sub-networks that may further overlay stand-alone ad-hoc networks, and the like, to provide an infrastructure-oriented connection for mobile devices 404-408. Such sub networks can include mesh networks, Wireless LAN (WLAN) networks, cellular networks, and the like. In some embodiments, a wireless network may include virtually any type of wireless communication mechanism by which signals may be communicated between computing devices.

Network 410 is configured to couple servers 414-422 with other computing devices, including, client device 402, and through wireless network 412 to mobile devices 404-408. Network 410 is enabled to employ any form of computer readable media or network for communicating information from one electronic device to another. Also, network 410 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine readable media, for example.

In some embodiments, the disclosed networks 410 and/or 412 can comprise a content distribution network(s). A "content delivery network" or "content distribution network" (CDN) generally refers to a distributed content delivery system that comprises a collection of computers or computing devices linked by a network or networks.

In some embodiments, the primary content server 420 can include a device that includes a configuration to provide any type or form of content via a network to another device. App server 414 (or servers 416-422) can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for can be provided via the App server 414, whereby a user is able to utilize such service upon the user being authenticated, verified or identified by the service. In some embodiments, servers 414-422 can store, obtain, retrieve, or provide primary content, targeted content, and/or any other data or metadata associated therewith, as discussed herein.

Servers 414-422 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 414-422 via the network 410 and/or wireless network 412 using their various devices 402-408.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 414, primary content server 420, and the like.

Thus, the App server 414, for example, can store various types of applications and application related information including application data and user profile information. It should also be understood that prefetch server 416, primary content server 420, and/or targeted content server 422 can also store various types of data related to the content and services provided by each in an associated content datastore 424, as discussed in more detail herein.

In some embodiments, targeted content server 422 (in some embodiments, an "ad server") can comprise a server that stores online advertisements for presentation to users. "Ad serving" refers to methods used to place online advertisements on websites, in applications, or other places where users are more likely to see them, such as during an online session or during computing platform use, for example.

Moreover, although FIG. 4 illustrates servers 414-422 as single computing devices, respectively, the disclosure is not so limited. For example, one or more functions of servers 414-422 can be distributed across one or more distinct computing devices. In one embodiment, one or more functions of servers 414-422 can be integrated into a single computing device, without departing from the scope of the present disclosure.

Figure 5:
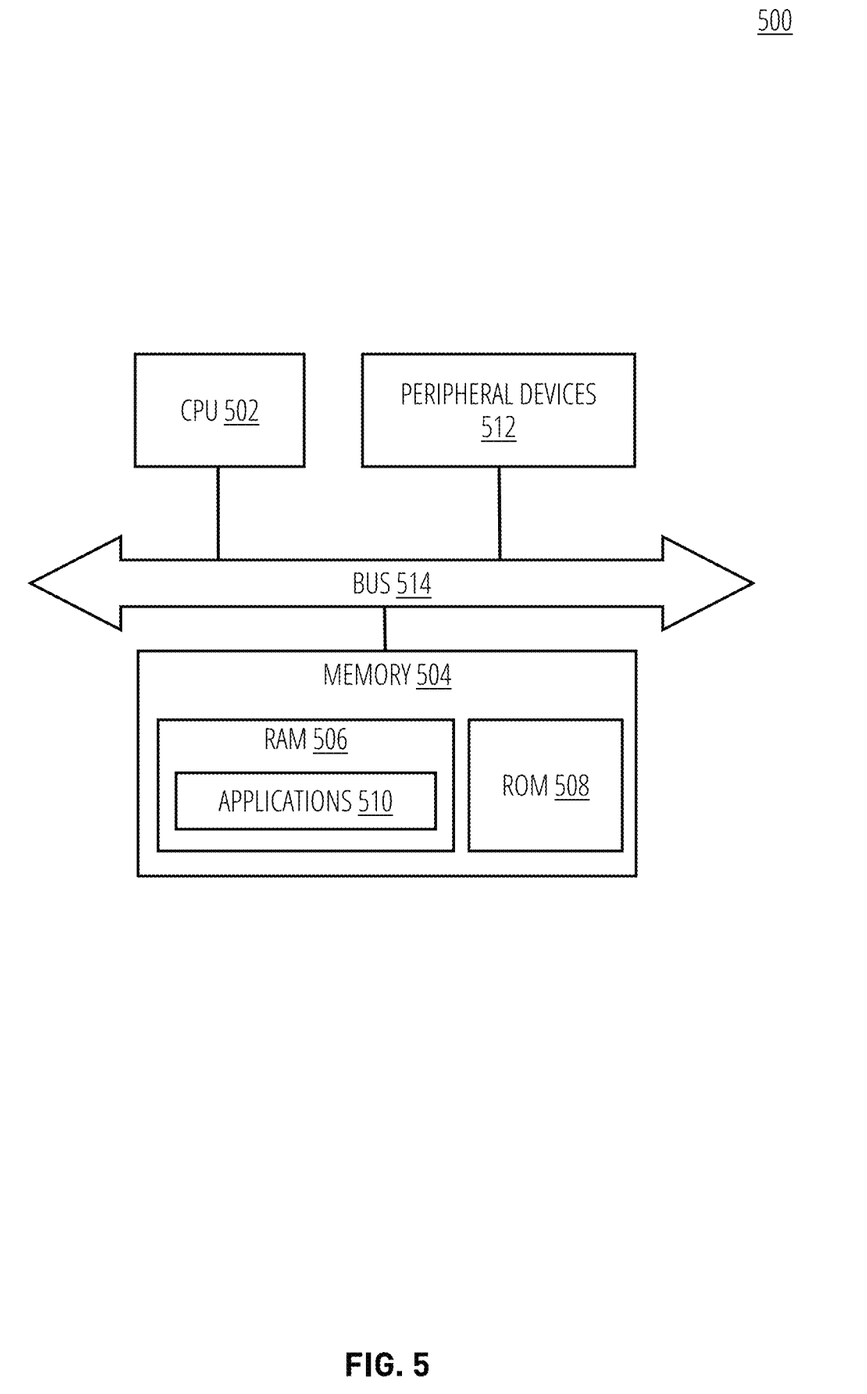
FIG. 5 is a block diagram of a device according to some embodiments.

FIG. 5 is a block diagram of a device according to some embodiments.

As illustrated, the device 500 can include a processor or central processing unit (CPU) such as CPU 502 in communication with a memory 504 via a bus 514. The device can also include one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 can comprise a general-purpose CPU. The CPU 502 can comprise a single-core or multiple-core CPU. The CPU 502 can comprise a system-on-a-chip (SoC) or a similar embedded system. In some embodiments, a graphics processing unit (GPU) can be used in place of, or in combination with, a CPU 502. Memory 504 can comprise a non-transitory memory system including a dynamic random-access memory (DRAM), static random-access memory (SRAM), Flash (e.g., NAND Flash), or combinations thereof. In one embodiment, the bus 514 can comprise a Peripheral Component Interconnect Express (PCIe) bus. In some embodiments, bus 514 can comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device 500 can optionally communicate with a base station (not shown) or directly with another computing device. One or more network interfaces in peripheral devices 512 are sometimes referred to as a transceiver, transceiving device, or network interface card (NIC).

An audio interface in Peripheral devices 512 produces and receives audio signals such as the sound of a human voice. For example, an audio interface may be coupled to a speaker and microphone (not shown) to enable telecommunication with others or generate an audio acknowledgement for some action. Displays in Peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 can comprise any input device arranged to receive input from a user. An illuminator in peripheral devices 512 can provide a status indication or provide light. The device can also comprise an input/output interface in peripheral devices 512 for communication with external devices, using communication technologies, such as USB, infrared, Bluetooth™, or the like. A haptic interface in peripheral devices 512 can provide a tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, from a primary content server, a prefetch request to prefetch a targeted content item to be presented prior to presenting a primary content item on a user device, the prefetch request including prefetch request parameters;
   generating, a callback Uniform Resource Locator (URL) associated with the prefetch request;
   transmitting, to the primary content server, the callback URL;

obtaining, from a targeted content mediation server, a targeted content configuration corresponding to the prefetch request parameters;

obtaining, from a targeted content server, the targeted content item based on the targeted content configuration;

receiving, from a client on the user device, a request to provide the targeted content item, the request including the callback URL; and transmitting, to the client, the targeted content item.

2. The method of claim 1, wherein generating the callback URL further includes generating a unique callback ID, wherein the unique callback ID is part of the callback URL, and wherein the unique callback ID is a universally unique identifier (UUID).

3. The method of claim 1, further comprising storing the targeted content item in a datastore and associating the targeted content item with the callback URL in the datastore.

4. The method of claim 3, further comprising upon receiving the request to provide the targeted content item, retrieving from the datastore the targeted content item associated with callback URL included in the request from the client.

5. The method of claim 1, wherein the targeted content configuration includes a waterfall sequence of targeted content URLs, and wherein obtaining the targeted content item includes resolving each of the targeted content URLs in the sequence until a responsive targeted content server is found.

6. The method of claim 1, wherein the targeted content item is an advertisement.

7. The method of claim 1, wherein the targeted content item can be transmitted to the client in a format selected from the group consisting of an Interactive Advertising Bureau (IAB) Video Multiple Ad Playlist (VMAP) format and a Video Ad Serving Template (VAST) format.

8. A non-transitory computer-readable storage medium, the computer-readable storage medium including instructions that when executed by a device, cause the device to:

receive, from a primary content server, a prefetch request to prefetch a targeted content item to be presented prior to presenting a primary content item on a user device, the prefetch request including prefetch request parameters;

generate, a callback Uniform Resource Locator (URL) associated with the prefetch request;

transmit, to the primary content server, the callback URL;

obtain, from a targeted content mediation server, a targeted content configuration corresponding to the prefetch request parameters;

obtain, from a targeted content server, the targeted content item based on the targeted content configuration;

receive, from a client on the user device, a request to provide the targeted content item, the request including the callback URL; and transmit, to the client, the targeted content item.

9. The computer-readable storage medium of claim 8, wherein generating the callback URL further includes generating a unique callback ID, wherein the unique callback ID is part of the callback URL, and wherein the unique callback ID is a universally unique identifier (UUID).

10. The computer-readable storage medium of claim 8, wherein the instructions further configure the device to store the targeted content item in a datastore and associate the targeted content item with the callback URL in the datastore.

11. The computer-readable storage medium of claim 10, wherein the instructions further configure the device to, upon receiving the request to provide the targeted content item, retrieve from the datastore the targeted content item associated with callback URL included in the request from the client.

12. The computer-readable storage medium of claim 8, wherein the targeted content configuration includes a waterfall sequence of targeted content URLs, and wherein obtaining the targeted content item includes resolving each of the targeted content URLs in the sequence until a responsive targeted content server is found.

13. The computer-readable storage medium of claim 8, wherein the targeted content item is an advertisement.

14. The computer-readable storage medium of claim 8, wherein the targeted content item can be transmitted to the client in a format selected from the group consisting of an Interactive Advertising Bureau (IAB) Video Multiple Ad Playlist (VMAP) format and a Video Ad Serving Template (VAST) format.

15. A computing device comprising:
a processor configured to:
receive, from a primary content server, a prefetch request to prefetch a targeted content item to be presented prior to presenting a primary content item on a user device, the prefetch request including prefetch request parameters;

generate, a callback Uniform Resource Locator (URL) associated with the prefetch request;

transmit, to the primary content server, the callback URL;

obtain, from a targeted content mediation server, a targeted content configuration corresponding to the prefetch request parameters;

obtain, from a targeted content server, the targeted content item based on the targeted content configuration;

receive, from a client on the user device, a request to provide the targeted content item, the request including the callback URL; and transmit, to the client, the targeted content item.

16. The computing device of claim 15, wherein generating the callback URL further includes generating a unique callback ID, wherein the unique callback ID is part of the callback URL, and wherein the unique callback ID is a universally unique identifier (UUID).

17. The computing device of claim 15, wherein the processor is further configured to store the targeted content item in a datastore and associate the targeted content item with the callback URL in the datastore.

18. The computing device of claim 17, wherein the processor is further configured to, upon receiving the request to provide the targeted content item, retrieve from the datastore the targeted content item associated with callback URL included in the request from the client.

19. The computing device of claim 15, wherein the targeted content configuration includes a waterfall sequence of targeted content URLs, and wherein obtaining the targeted content item includes resolving each of the targeted content URLs in the sequence until a responsive targeted content server is found.

20. The computing device of claim 15, wherein the targeted content item can be transmitted to the client in a format selected from the group consisting of an Interactive Advertising Bureau (IAB) Video Multiple Ad Playlist (VMAP) format and a Video Ad Serving Template (VAST) format.

* * * * *